United States Patent [19]

Byrne et al.

[11] Patent Number: 4,817,561
[45] Date of Patent: Apr. 4, 1989

[54] AQUATIC AERATION AND FILTERING SYSTEM

[75] Inventors: Thomas D. Byrne, Rolling Meadows; Martin Sliva, Cary, both of Ill.

[73] Assignee: Ichthyotech, Ltd., Rolling Meadows, Ill.

[21] Appl. No.: 943,247

[22] Filed: Dec. 17, 1986

[51] Int. Cl.[4] ............................................. A01K 63/00
[52] U.S. Cl. .......................................... 119/5; 119/3; 210/169; 210/416.2
[58] Field of Search ............ 119/3, 5; 210/169, 416.2; 261/87, 93

[56] References Cited

U.S. PATENT DOCUMENTS

| | | | |
|---|---|---|---|
| 616,997 | 1/1899 | Whitney | 261/87 |
| 950,999 | 3/1910 | Erlwein et al. | 119/5 |
| 2,243,302 | 5/1941 | Weinig | 261/93 |
| 2,678,512 | 5/1954 | Maston | 119/5 |
| 3,294,239 | 12/1966 | Dayes | 210/169 |
| 3,734,853 | 5/1973 | Horvath | 210/169 |
| 3,897,338 | 7/1975 | Bennett et al. | 210/169 |

FOREIGN PATENT DOCUMENTS 1126264  4/1983  U.S.S.R. ............................. 119/3

Primary Examiner—Paul J. Hirsch
Assistant Examiner—Joyce M. Britt
Attorney, Agent, or Firm—Robert E. Wagner; Ralph R. Rath

[57] ABSTRACT

An aeration and filtering system for an aquarim includes a porous filter bed that is spaced above the tank bottom with pump means located in the chamber defined below the filter bed and having an upper inlet for receiving oxygen-enriched liquid from adjacent the liquid level in the tank and at the same time receiving oxygen-deficient liquid from adjacent the bottom of the tank. These two liquids are then mixed within the pump to provide an oxygen-enriched liquid which is fed through a discharge port that is directed generally parallel to the liquid level and slightly below to provide an exercising environment for aquatic life.

21 Claims, 3 Drawing Sheets

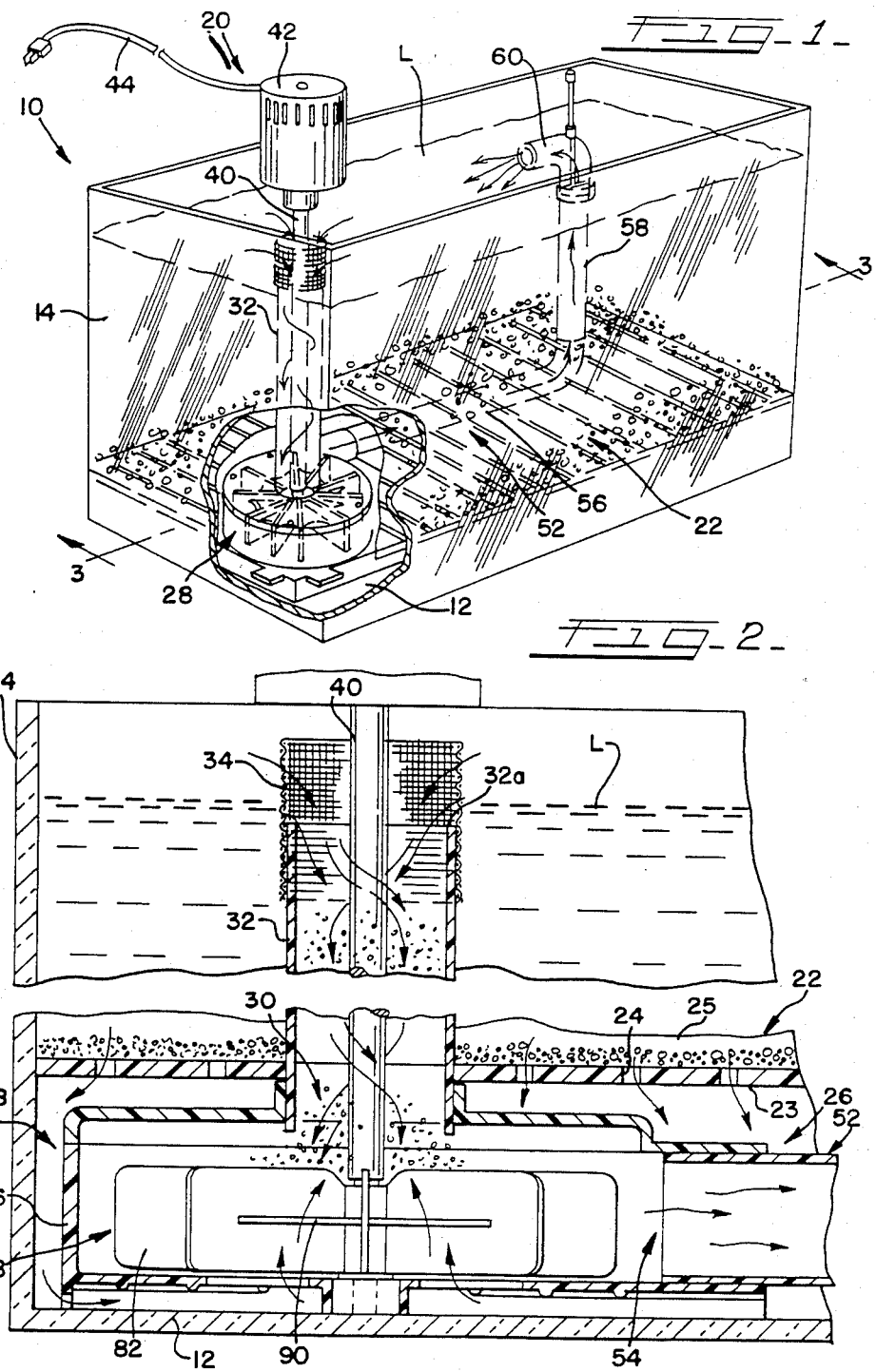

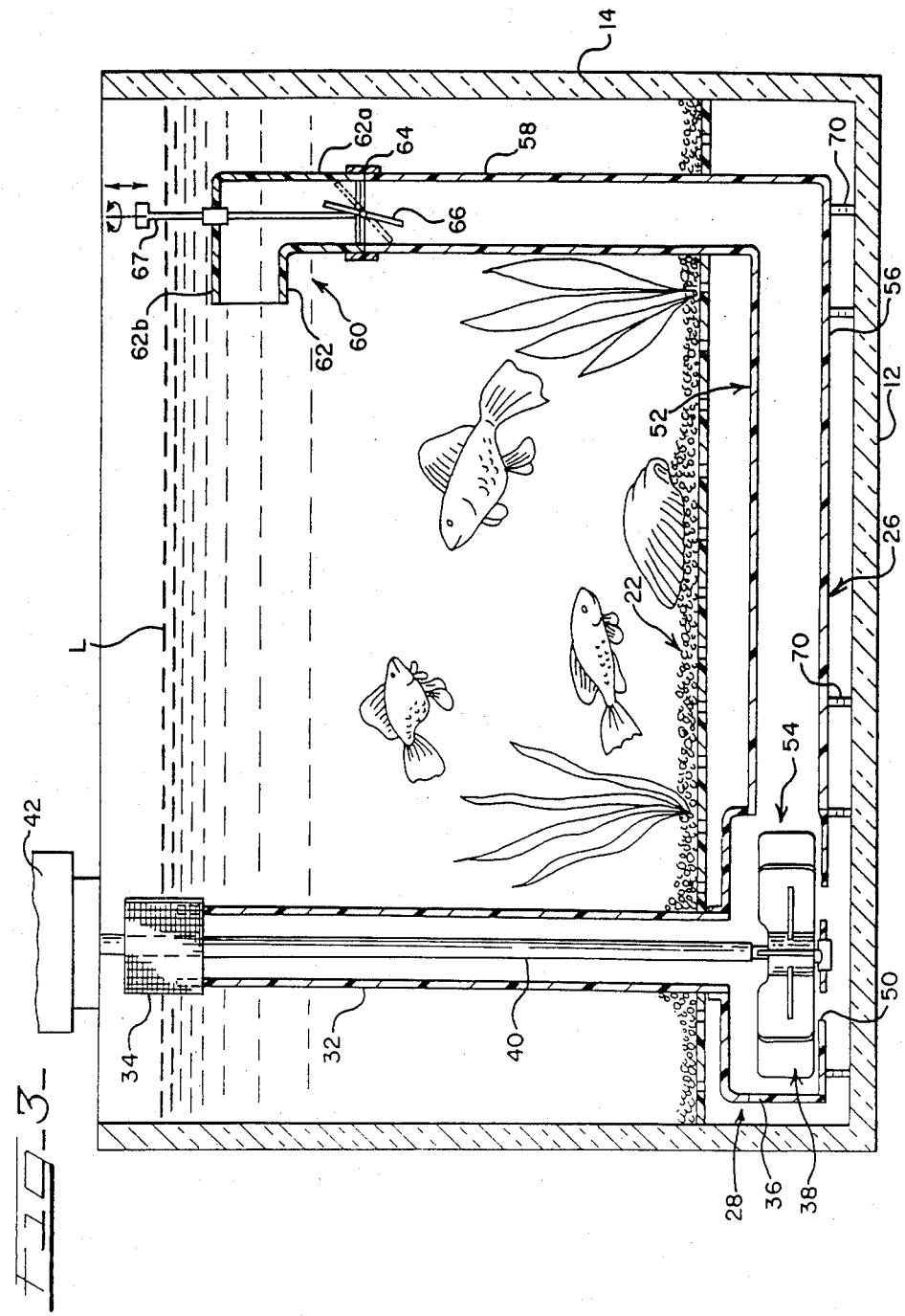

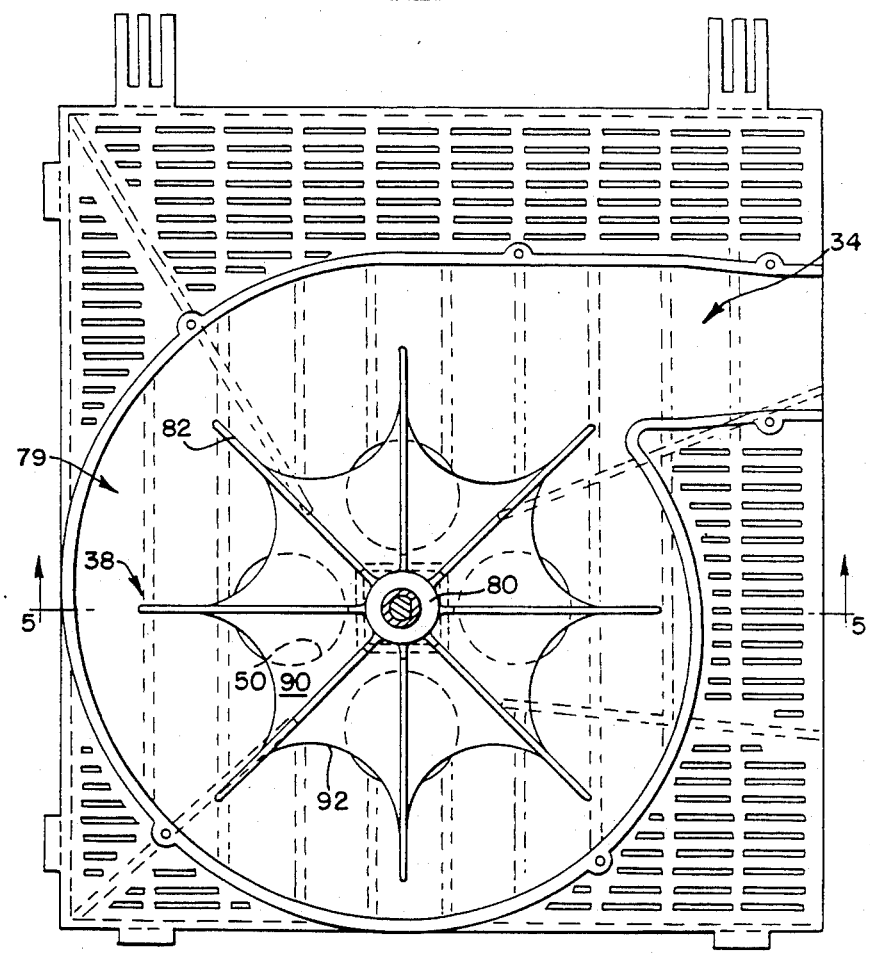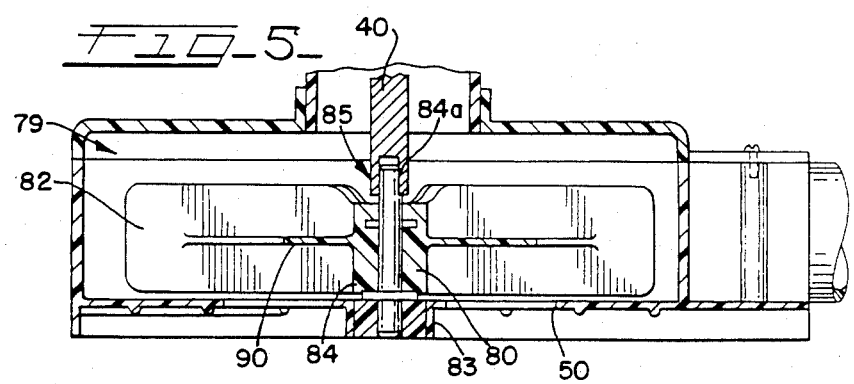

AQUATIC AERATION AND FILTERING SYSTEM

TECHNICAL FIELD

The present invention relates generally to an aquarium circulating system and, more particularly, to an improved aeration and filtering system for effectively cleaning, aerating and purifying liquid in an aquarium.

BACKGROUND PRIOR ART

As is well known, liquid or water of an aquarium must be maintained substantially free of organic-based materials, such as excess fish food, excrements and other contaminants which may be damaging to aquatic life. Several different types of filters and aerators have been developed which have met with varying degrees of success in maintaining the desired water conditions. However, these in general have not proven to be entirely satisfactory, either because they do not have sufficient water circulation capacity, require regular replacement of all of the water in the tank, or are too expensive to manufacture, too costly to operate or too difficult to clean.

One type of system that has been used for filtering and aerating an aquarium, particularly the small-capacity type as found in homes, is an air circulation system. An example of an air circulation system is disclosed in U.S. Pat. No. 3,294,239, wherein a pressurized supply of air is delivered to a lower chamber where air is introduced into the liquid by surface contact. An air pump then draws the air from the lower chamber and water from the tank into a tube for mixture, which is then delivered through a filter into the tank. This type of system relies to a large degree upon the absorption of the air into the water by increasing the air/water surface contact area within the tank. Thus, the primary oxygen supply into the liquid is by absorption.

Another air-type filtering system is disclosed in U.S. Pat. No. 3,490,416, wherein an elongated apertured tube is located in a confined area adjacent the bottom of an aquarium to introduce air bubbles into the liquid to aerate the water and provide a high percentage of oxygen saturation. As a result of the flow of the air bubbles, the water is circulated through a filtering system to provide filtration and purification of the water.

In such a system, it is easy to supply an adequate amount of oxygen to support aquatic life. However, in such systems, it is difficult to maintain a proper environment to remove the excess food, waste materials and excrements from the water. While such materials may be collected in a filter, which is normally part of such a system, the filter requires frequent replacement, which not only is costly but also is time consuming for the owner.

In most filtering systems, aerobic bacteria is developed on the filter bed or filter element which is designed to destroy waste and purify the water. However, with the very limited circulation of the water in the system, such as disclosed in U.S. Pat. No. 3,294,239, it is very difficult to produce an effective and efficient bacterial action which will dispose of the wastes in the water. Thus, in many instances, the filter must be frequently replaced and, in addition, the water in the aquarium tank will have to be replaced with fresh water.

Another type of system is what may be referred to as a "water pump-induced circulation system", is considered to be much more efficient than an air-induced circulation system. In the water pump system, the pump has an impeller element which exerts force directly on the incompressible fluid and thus forces the entire body of water in the tank through the filter, thereby eliminating the need for reliance upon gravitational forces, expansion of air bubbles and other hard to control factors. An example of such type of system is disclosed in U.S. Pat. No. 3,722,685 wherein a lower chamber is defined in the bottom of the aquarium tank and has a centrifugal water pump located therein which draws water from the chamber and circulates the water through a filter that is located above the water level for easy access for replacement. The cleansed water, after passing through the filter, is returned to the bottom chamber within the tank. This system is designed for a large capacity pump to draw from the bottom of the tank through the upper exposed filter. Again, with such a system, it is extremely difficult to provide proper oxygen supply into the liquid in the tank to support aquatic life because the oxygen is supplied to the water by absorption at the surface.

Other more elaborate types of aeration and filtering systems have been developed, such as for example shown in U.S. Pat. Nos. 3,418,973; 3,971,338 and 4,098,230. However, most of the prior art known systems are either too costly to manufacture and/or too costly to maintain.

SUMMARY OF THE INVENTION

According to the present invention, the unique aeration and filtering system has been developed which can be manufactured at a minimum cost, installed into an existing aquarium tank without any modification thereof and is effective for providing a large amount of oxygen into the liquid to support aquatic life forms and at the same time destroy the waste materials within the tank. More specifically, the present invention employs a pumping system which simultaneously draws liquid directly through a filtering bed and at the same time draws oxygen from the surrounding atmosphere to mix with the oxygen depleted liquid or water in the tank.

The velocity and volume of the oxygen-enriched fluid mixture are controlled by the configuration and location of the components so that the oxygen-enriched fluid is first distributed for use by the upper aquatic life forms for respiration and then is drawn through a filtering matrix to support an aerobic microbiological matrix. The pumping system has sufficient capacity to rapidly completely recirculate all of the liquid within the tank through the filtering system so that a sufficient amount of oxygen is in the water when it passes through the filtering system for development of aerobic bacteria that will destroy wastes and secretions to purify the liquid. The system is designed to produce an aerobically balanced filtering system containing organisms which process the waste products of the higher life forms in the system and at the same time substantially reduce the toxin levels in the liquid. The resultant ecological balance is predicated on the large amount of fluid transferred through the filtering bed which causes the entrainment of waste products, food and bacteria into and onto the filter bed. The high flow rate of oxygen-enriched fluid at the filter bed guarantees a predominance of aerobic bacteria by creating conditions favorable to their existence.

More specifically, the aeration and filtering system of the present invention is specifically designed for an aquarium that has a bottom wall and upstanding side walls with a porous filter bed spaced above the bottom wall to define a lower liquid chamber. A pump means is located within the lower liquid chamber and has an upper inlet opening adjacent the liquid level in the tank to draw liquid from the tank or from the surface liquid level and at the same time, to draw oxygen from the surrounding atmosphere to the mix therewith which is delivered to the pump. The pump also has a lower inlet means for drawing liquid depleted of oxygen from the lower chamber to be mixed with the oxygenated mixture delivered to the pump to thereby produce an oxygen-rich liquid mixture that is delivered to the tank adjacent the upper level of the liquid.

The oxygen-rich liquid mixture is first drawn through the main body of the water which is inhabited by the aquatic life forms to provide oxygen for respiration. The remainder of the oxygen-enriched liquid is then drawn through the filter bed to support the aerobic bacteria growth which will remove the waste products from the liquid. The resultant system is designed to minimize the maintenance required for maintaining a purified liquid system for aerobic life and reduce the number of filter cleanings or water replacements.

According to another aspect of the present invention, the outlet of the pump means is positioned adjacent the upper liquid level in the tank to produce a flow velocity component that extends generally horizontal to the liquid level to produce a condition in which the aquatic life forms can swim against a high velocity flow of liquid emulating a natural stream or current and at the same time have a relatively low velocity area in which the aquatic life can rest.

In the specific illustrated embodiment, the aeration and filtering system consists of a porous filter bed with a pump located below the bed and having an upper inlet tube extending therefrom to the surface of the water or liquid in the tank and having a second lower inlet for drawing liquid from the bottom of the tank to be mixed with the remaining liquid received by the pump. The upper inlet to the pump is designed such that the water gravity-flows into the tube inlet and is then drawn by the pump to a level below the liquid level in the tank to create a flow within the tube that will entrain air with the liquid being drawn into the pump.

The pump outlet preferably consists of a tube that extends towards the surface of the water and terminates in a swivel outlet that has a flow control means therein so that the direction and velocity of the exiting oxygen-rich mixture can easily be controlled and directed. In addition, the pump drive means for the system is preferably located outside of the water above the water level in the tank and in the embodiment illustrated, includes a motor that is supported adjacent the upper end of the inlet tube and is connected to an impeller through a shaft that extends through the tube. This eliminates the need for providing the more expensive waterproof submersible pump that must have energy supplied through a waterproof power system.

BRIEF DESCRIPTION OF SEVERAL VIEWS OF DRAWINGS

FIG. 1 is a perspective view of an aquarium having the present invention incorporated therein;

FIG. 2 is an enlarged fragmentary cross-sectional view of the pump mechanism of the invention;

FIG. 3 is a cross-sectional view as viewed along line 3—3 of FIG. 1;

FIG. 4 is an enlarged fragmentary plan view of the pump; and,

FIG. 5 is a cross-sectional view as viewed along line 5—5 of FIG. 4.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

Referring now to FIG. 1 of the drawings, there is disclosed an aquarium generally designated by reference numeral 10 having a bottom wall 12 and a plurality of upstanding side walls 14 extending from the peripheral edges of the bottom wall. The tank is preferably, although not necessarily, a home aquarium tank of the 30 or 40 gallon variety which is utilized for maintaining aquatic life, such as fish.

The filtering and aeration system of the present invention is generally designated by reference numeral 20 and is designed to be easily inserted into the tank 10. According to the present invention, the filtering and aeration system consists of a filter bed 22 that is dimensioned to be substantially coextensive with the bottom wall 12. The filter bed 22 includes a lower support bed or member 23 that has a plurality of openings 24 located therein. A porous filtering media 25, such as gravel or any other type of particulate matter, is supported on porous member 23 and is designed to be favorable for producing aerobic bacteria. The filter bed 22 defines a lower liquid chamber 26 with a pump means 28 located in the lower chamber 26.

The pump means 28 has a first or upper inlet 30 which inludes a vertical tube 32, the upper edge 32a of which terminates slightly below the liquid level L of the liquid, such as water, within the tank. The tube 32 is preferably circular and has a filter screen 34 on its upper open end to filter any liquid flowing into the tube, as will be described later. The tube 32 is preferably telescoped into the opening 30 and vertically adjustable, for a purpose that will be described later.

The pump means 28 consists of a housing 36 that is located in the chamber 26 defined by the bottom wall 12 and the partition filter bed 22, as most clearly shown in FIG. 3. A rotating impeller 38 is supported in the housing and has a shaft 40 extending therefrom. The shaft 40 extends through and is axially aligned with the center of the tube 32 and has a drive motor 42 connected to the upper end thereof. The lower end of shaft 40 is coupled to the impeller 38 by a coupling, which will be described later.

The drive motor 42 could either be a fixed speed or a variable speed motor connected to a power source through a cord 44. The pump housing 36 also has a lower inlet means in the form of a plurality of openings 50 that are circumferentially spaced around the perimeter of the axis of the impeller 38 defined by the rotating shaft 40.

The pump housing 36 has a discharge tube or conduit means 52 extending from an outlet opening 54. The conduit means 52 has a horizontal conduit portion 56 that extends generally parallel to the bottom wall 12 and the filter bed 22 toward one of the side walls 14 located opposite the side wall which has the tube 32 positioned in juxtaposed relation thereto. The conduit means 52 also includes a vertical conduit portion 58 that extends generally parallel to the opposite side wall and has an outlet 60 on the upper end thereof.

In the embodiment illustrated in the drawings, the outlet 60 consists of a swivel tube 62 that is rotatably connected to the upper end of the tube portion 58 by a swivel connection 64. As shown in FIG. 3, the swivel tube 62 or outlet is in the form of an elbow that has a vertical component 62a defining an extension of the vertical tube 58 and a horizontal component 62b that has an axial opening, the axis of which extends substantially parallel to the liquid level L in the tank. A flow control means or flap valve 66 is supported in the tube 62 and has a control rod 67 extending therefrom to a point above the liquid level L in the tank.

In the embodiment illustrated in the drawings, the housing 36 and the lower portion of the discharge tube 52 have support members 70 extending from a lower portion so that the pump means and conduit means are supported slightly above the tank bottom 12, as illustrated in FIG. 3.

According to one aspect of the present invention, the pump means is preferably a low speed, high volume submersible pump that is specifically designed to maximize oxygen absorption of the liquid within the tank during the pumping process. Also, the pump is specifically designed to intimately and thoroughly mix the liquid and oxygen and provide a saturated liquid-air mixture which is discharged into the tank at a desired flow and velocity.

Thus, as illustrated in FIGS. 4 and 5, the pump housing 36 defines an impeller chamber 79 that is generally circular in plan view and has the discharge opening 54 formed integral therewith and extending substantially tangentially of the outer perimeter of the circular chamber 79.

The pump impeller 38 preferably consists of a central hub 80 that has a plurality of circumferentially spaced radially extending blades or fins 82 extending from the periphery thereof. The central hub 80 is rotatably supported in a socket 83 which is part of the housing 36. The hub has a stub shaft 84 which has a flattened portion 84a that is coupled to the lower end of the shaft 40 through a telescoping coupling 85.

The impeller 38 has a plurality of mixing webs or deflector means 90 integrally joining the adjacent surfaces of two adjacent blades 82 and the webs extend from the central hub 80 and terminate in a concave outer surface 92, as is most clearly shown in FIG. 4. It should be noted in FIG. 4 that the lower circular openings 50 that define the lower inlet to the mixing or impeller chamber 79 are positioned such that they are radially-spaced from the center hub 80 and are in axial alignment with the connecting webs 90. Also, the tube 32 connected to the upper inlet 30 to the housing is axially aligned with the central hub 80 of the impeller, for a purpose that will be described later.

The unit so far described operates as follows, with particular reference to FIGS. 1 through 3. With the aeration and filtering system installed within the tank 10, as illustrated in FIG. 3, the rotation of the impeller 38 will produce a negative pressure adjacent the upper inlet opening 30, as well as the lower inlet openings 50. Since the upper edge of the tube 32 is located slightly below the liquid level L, the liquid will flow by gravity into the generally circular tube 32 where the liquid level therein is maintained below the liquid level L in the tank by the suction of pump 28. The telescoping arrangement of the tube 32 in the opening 30 will accommodate accurate adjustment of the upper edge 32a with respect to the liquid level.

Thus, the water flowing by gravity into the tube is essentially free-falling and strikes the lower water level in the tube to create a turbulence thereon. At the same time, the suction of the pump on the lower end of the tube 32 will create a velocity which will entrain air in the liquid within the tube and maximize the the surface area for introduction of atmospheric air, i.e., oxygen, into the liquid or water within the tube. This will produce an oxygen-rich mixture of air and liquid that is drawn in through the upper inlet opening 30 of the pump housing 36.

At the same time, the rotation of the impeller 38 within the pump housing will draw liquid from the lower chamber 26 of the tank below the filtration bed 22 through the openings 50. The oxygen-rich liquid flowing down the tube 32 will be drawn towards the center of the impeller 38 because of the negative pressure created around the central shaft and above the webs 38 while the liquid flowing through the openings 50 will be drawn towards the center of the impeller below the rotating webs 90. The two liquids will then be deflected radially outwardly because of the centrifugal forces developed by the rotating impeller 38 particularly the blades 82. In addition, a mixing vortex is created adjacent the outer arcuate edges 92 of the webs 90 so that the oxygen-rich liquid received through the inlet tube 32 will be thoroughly mixed with the oxygen-depleted liquid drawn in through the lower inlet openings 50. More specifically, the oxygen-enriched liquid will have a downward and radially-outward component of flow while the liquid flowing through openings 50 will have an upward and outward component of flow. These components of liquid flow will be intermixed in the pressure void created in the area just beyond arcuate edges 92.

Thus, the pump means will provide a thorough oxygen-enriched mixture that is delivered through the discharge conduit. The oxygen-enriched liquid mixture will then flow through the horizontal component of the discharge tube below the filter bed 22 and vertically through the upwardly directed tube portion 58 and will ultimately be directed generally horizontally or parallel to the liquid level L at a predetermined velocity. This predetermined velocity can be adjusted by the flow control valve 66 that is located within the outlet 60.

Since the pump inlet openings for the liquid that is drawn from the lower portion of the tank are located below the filter bed 22, the oxygen-enriched mixture delivered through outlet 60 will be drawn towards the bottom of the tank and will be available for distribution for use in the upper portion of the tank for respiration of aquatic life forms. The oxygen-rich mixture is then drawn through the porous filter bed where the oxygen will be absorbed by the aerobic organic substance along the filter bed to enhance propagation of organisms which will process the waste products accumulated along the filter bed.

The system is designed such that there is an aerobically balanced filter system containing organisms which process the waste products of the higher life forms in the system. This allows an increased period between any required water changes in the tank system due to the reduction of metabolic toxin levels in the system. This ecological balance is predicated on the fact that there is a large fluid transfer through the gravel support system which causes the entrainment of waste products, food and bacteria onto and into the gravel or particulate filter bed. Also, the high flow rate of oxygen-rich fluid guarantees the predominance of aerobic bacteria by creating conditions favorable to their existence.

As indicated above, the pump is preferably a high volume low head pressure system that will rapidly recirculate the water within the tank. By way of example and not of limitation, the pump capacity is preferably such that approximately one-fourth of the water is recirculated every minute of operation.

It should be noted that the level of the liquid within the suction tube supply means 32 will be dependent upon the pressure drop across the filter bed, which of course is dependent upon the porosity of the structure, as well as the granular size of the particulate material that forms part of the filter bed 22.

One significant advantage of the present system is that the velocity of the oxygen-enriched liquid can easily be varied by the flow and direction control nozzle or outlet 62. In the specific embodiment illustrated, the velocity component is generally in the horizontal direction parallel to the liquid level in the tank. This has the advantage in that the fluid motivating forces of the liquid through the outlet will create a variable flow environment in which any aquatic life form can swim in flowing stream conditions while in a stationary position to thereby provide a swimming and exercising environment for the aquatic life. Also, since the outlet is of limited size, this flow velocity of the liquid will be in a limited confined area adjacent the outlet while the remaining areas are less turbulent where the aquatic life can rest.

It should also be noted that while a specific embodiment of the invention has been disclosed and described, numerous modifications come to mind without departing from the spirit of the invention. For example, the outlet means or swivel tube could easily be replaced with some other variable type of flow regulating system. For example, the outlet could be in the form of a tube having plates with variable sized openings on the end thereof to control the amount of flow through the outlet which, in turn, would control the flow through the entire system. In addition, the swivel arrangement could be eliminated and some type of deflector member could be utilized to direct the flowing liquid where desired.

While specific embodiments have been illustrated and described, numerous modifications come to mind without significantly departing from the spirit of the invention and the scope of protection is only limited by the scope of the accompanying claims.

We claim:

1. An aeration and filtering system for an aquarium having a bottom wall and upstanding side walls with a porous filter bed spaced above said bottom wall and having a liquid therein defining a liquid level, pump means between said bottom wall and said filter bed and having a first inlet adjacent said liquid level to draw liquid from said tank and oxygen from the surrounding atmosphere air to be mixed therewith to produce an oxygenated liquid mixture and having a second inlet for drawing liquid substantially depleted of oxygen from below said filter bed to be mixed with said oxygenated mixture to produce an oxygen-rich liquid mixture, and conduit means extending from said pump means to a level below said liquid level in said tank so that said oxygen-rich liquid mixture is drawn toward and through said filter bed to produce aerobic bacteria on said filter bed for digestion of waste products from aquatic life while oxygen is available in said liquid above said filter bed for sustaining aquatic life.

2. An aeration and filtering system as defined in claim 1, in which said pump means includes a housing having said inlet means located in a bottom thereof and having an upper opening receiving a tube therein defining said inlet with an impeller rotatable in said housing so that liquid will flow into said tube and mix with atmospheric air therein to oxygenate the water in said tube.

3. An aquarium as defined in claim 2, in which said conduit means has an outlet located below said liquid level and extending substantially parallel thereto to provide a flow velocity for use by aquatic life for exercising and swimming.

4. An aquarium as defined in claim 3, in which said conduit means including a horizontal component extending between said bottom wall and said filter bed and a generally vertical component extending above said filter bed with said outlet terminating below said liquid level.

5. An aquarium as defined in claim 4, in which said outlet includes a swivel tube connected to an upper end of said vertical component and flow control means in said outlet for controlling the velocity of oxygen-rich liquid flowing through said outlet.

6. An aquarium as defined in any one of claims 2, 3, 4 or 5, in which said tube is substantially circular and has a drive shaft extending therethrough to drive said pump means so that said pump means creates a suction in said tube to lower the liquid level therein whereby the liquid from said tank flows over said upper inlet and creates a mixing vortex in said tube to maximize the amount of oxygen mixed with said liquid in said tube.

7. An aquarium as defined in any one of claims 2, 3, 4 or 5, in which said impeller has a plurality of circumferentially-spaced radially extending blades and deflector means between said blades to direct liquid flow from said inlet and said inlet means radially outwardly to be mixed by said rotating impeller blades.

8. An aeration and filtering system for a confined body of water having a bottom and a porous filter bed spaced above said bottom wall to define a chamber with said body of water having an upper liquid level, said aeration and filtering system including pump means in said chamber adjacent said bottom below said filter bed, supply means for delivering oxygenated water from adjacent said water level into said pump means with said pump means drawing oxygen-depleted water from said chamber to intermix with said oxygenated water, said conduit means leading from said pump into said tank to disperse oxygen-laden water into said body of water below said water level to aerate the water therein and be drawn through said filter bed into said chamber.

9. An aeration and filtering system as defined in claim 8, in which said pump means includes a housing below said filter bed having an impeller rotatable therein with upper and lower inlets in said housing, said supply means delivering oxygenated water through said upper inlet with said impeller drawing water from below said filter bed through said lower inlet to mix with the oxygenated water.

10. An aeration and filtering system as defined in claim 9, in which said supply means includes a tube extending from said upper inlet and terminating slightly below said water level with an upper open end in communication with the surrounding atmospheric air so that water will gravity-flow into said tube and mix with atmospheric air to oxygenate the water therein.

11. An aeration and filtering system as defined in claim 10, in which said supply means includes a tube adjacent one side wall having an upper open end below said water level to provide gravity flow into said tube and in communication with atmospheric air and in which said pump means draws said water in said tube below said water level and creates a vortex in said tube for admixing oxygen from said atmospheric air into said water in said tube.

12. An aeration and filtering system as defined in any one of claims 9, 10 or 11, in which said impeller includes a central hub having a plurality of circumferentially-spaced radially-extending blades and webs interconnecting inner portions of adjacent blades with said lower inlet being defined by circumferentially-spaced openings around said hub and aligned with said webs so that liquids will be directed outwardly between said blades by said webs to produce a highly-aerated mixture.

13. An aeration and filtering system as defined in any one of claims 9, 10 or 11, in which said conduit means extends from said pump means towards said water level with an adjustable outlet on an upper end of thereof for directing fluid generally parallel to said liquid level.

14. An aeration and filtering system as defined in claim 11, in which said tube is axially aligned with said hub and has a shaft extending therethrough and connected to said hub with drive means on said shaft above said water level driving said impeller.

15. In an aeration and filtering system for an aquarium including a tank having a bottom wall and spaced side walls extending upwardly from peripheral edges of said bottom wall with a porous filter bed located above said bottom wall and defining a lower chamber with liquid in said tank having an upper liquid level, pump means in said lower chamber and having (1) a first upper inlet adjacent said liquid level for drawing liquid mixed with oxygen from adjacent said liquid level and an atmospheric environment above said liquid level for delivery into said pump means; (2) a second lower inlet for drawing liquid into said pump means from said lower chamber; and, (3) outlet means above said filter bed, said pump means including an impeller rotatable in a housing and having radially-extending, circumferentially-spaced impeller blades with deflector means between adjacent inner portions of adjacent impeller blades, said upper and lower inlets being positioned to direct liquid towards upper and lower surfaces of said deflector means to be forced radially outwardly and enhance the mixture of respective liquids by said impeller blades for delivery of an oxygen-rich liquid through said outlet means which is discharged through said liquid in said tank above said porous filter bed for supplying oxygen to aquatic life and then through said porous filter bed to enhance propogation of aerobic bacteria at said filter bed for disposal of waste materials collected by said filter bed.

16. An aeration and filtering device as defined in claim 15, in which said outlet means is located adjacent one side wall slightly below said liquid level for directing oxygen-rich liquid flow generally parallel to said liquid level to be drawn downward toward and through said porous filter bed.

17. An aeration and filter system a defined in claim 16, in which said first upper inlet includes a tube extending from said pump means adjacent an opposite side wall and terminating slightly below said liquid level to accommodate gravity flow of liquid into said tube and absorbing oxygen from said atmospheric mixture for said pump means with filter screen means surrounding said tube at said liquid level to filter liquid flowing into said tube.

18. An aeration and filter system as defined in claim 17, in which said pump means includes motor drive means located above said liquid level and aligned with said tube and having a drive shaft extending through said tube and connected to said impeller.

19. An aeration and filtering system as defined in claim 18, in which said drive shaft includes a telescoping coupling for connection to said impeller.

20. An aeration and filtering system as defined in claim 19, in which said housing has an opening telescopingly receiving said tube to be vertically adjustable to accurately position an upper free edge with respect to said liquid level.

21. An aeration and filtering system for a confined body of water having a bottom and comprising a porous filter bed spaced above said bottom and cooperating therewith to define an enclosed chamber, pump means in said chamber and having a first upper inlet adjacent an upper liquid level of said confined body of water for drawing liquid mixed with oxygen from adjacent said liquid level and an atmospheric environment above said liquid level, said pump means having a second lower inlet for withdrawing liquid from said enclosed chamber into said pump to mix with the oxygen-enriched liquid from said first upper inlet, and outlet means extending from said pump means through said chamber to a location proximate to and below said liquid level so that oxygen-enriched liquid is delivered through said outlet means into said body of water and is drawn through said filter bed into said chamber to enhance propagation of aerobic bacteria at said filter bed for disposal of waste materials collected by said filter bed.

* * * * *